United States Patent Office 3,548,027
Patented Dec. 15, 1970

3,548,027
COATINGS BASED ON ACRYLIC COPOLYMERS AND AMINOPLASTS
Karl-Heinz Hornung, Ernst-Christian Schütze, and Rudolf Nehring, Marl, Germany, assignors to Chemische Werke Huels A.G., Marl, Germany
No Drawing. Filed Dec. 8, 1967, Ser. No. 688,979
Claims priority, application Germany, Dec. 10, 1966, C 40,943
Int. Cl. C08g 37/32, 37/34
U.S. Cl. 260—850                               12 Claims

ABSTRACT OF THE DISCLOSURE

Impact-resistant aminoplast - polyacrylate coatings wherein the polyacrylate is a copolymer of:

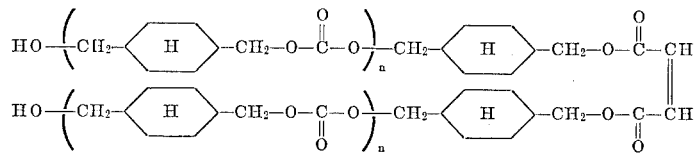

wherein $n$ is 4–12, preferably 5–10.

BACKGROUND OF THE INVENTION

This invention relates to coatings based on a mixture of: (A) polyacrylates containing free hydroxyl groups, and (B) aminoplasts.

It is known from U.S. Pat. No. 2,681,897 that copolymers can be produced from ω-hydroxyalkyl esters of α,β-unsaturated acids (e.g., of acrylic acid) and other monoethylenically unsaturated compounds, and that these copolymers can be cured with aminoplasts. Suitable as monoethylenically unsaturated compounds are, for example, methacrylates, acrylates, and styrene.

Also known, from German Auslegeschrift (Published Application) No. 1,183,617, is a process wherein the β-hydroxypropyl ester of acrylic acid (or of an alkylacrylic acid) is copolymerized with an α,β-unsaturated carboxylic acid (e.g., acrylic acid) and at least one other ethylenically unsaturated compound, the resulting copolymerizate being cured with an aminoplast. In this connection, useful ethylenically unsaturated compounds are, for example, methacrylates, acrylates, and styrene.

From the multitude of conventional compositions, as embraced by the above prior art, combinations can be selected which lead to coatings having satisfactory elasticity and a relatively good hardness. However, such coatings are devoid of sufficient impact resistance for many applications (see Comparative Examples I and II).

SUMMARY OF THE INVENTION

An object of this invention is to provide novel coatings wherein a high degree of hardness and elasticity is coupled with high impact strength.

Another object is to provide novel coating compositions and ingredients for same.

Upon further study of the specification and claims, other objects and advantages of the present invention will become apparent.

To attain the objects of this invention, there is copolymerized an unsaturated dicarboxylic acid ester of the general formula:

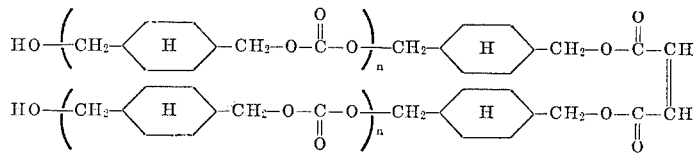

wherein $n$ represents 4–12, preferably 5–10, with an acrylate or a methacrylate, and if desired, with acrylic acid. The resultant copolymerizate is then cured in a conventional manner with aminoplasts or precursors thereof.

Dicarboxylic acid esters of the above general formula can be obtained by esterification of fumaric acid or maleic acid anhydride, preferably fumaric acid, with the corresponding dihydroxy compounds containing carbonate groups. Production of the latter compounds is described in the Belgian patent specification No. 693,956 (U.S. patent application Ser. No. 610,230, filed Jan. 19, 1967). For the reaction conditions for the esterification reaction see our concurrently filed pending application entitled "Hard, Elastic, and Impact Resistant Coatings," Ser. No. 688,968.

Suitable acrylates or methacrylates for copolymerization include but are not limited to alkyl esters of 1–4 carbon atoms, in the alkyl portion, preferably methyl methacrylate, ethyl acrylate, and butyl acrylate.

The weight ratio of acrylate (or methacrylate) to the dihydroxy compound (the ester) in the copolymer is generally about 10:90 to 50:50, preferably 15:85 to 50:50. If acrylic acid is employed, the weight ratio of the same to the total of acrylate and dihydroxy compound (the copolymer) is generally about 0.1:99.9 to 5:95, preferably 0.5:99.5 to 2:98.

To conduct the copolymerization, it is preferred that the monomers are first dispersed in an aromatic hydrocarbon solvent, for example, benzene, toluene or xylene. Suitable initiators are conventional peroxides or azo compounds, e.g., benzoyl peroxide or azodiisobutyric acid nitrile. The reaction mixture is heated for 6–10 hours to temperatures of 70–80° C. For other free radical addition initiators (catalysts), reference can be made to B. Vollmert, "Grundrisse der makromolekularen Chemie," Springer-Verlag, Berlin, Göttingen, Heidelberg, 1962, page 38; L. Küchler, "Polymerisationskinetik," Springer-Verlag, Berlin, Göttingen, Heidelberg, 1961, page 99; Houben-Weyl-Müller, "Methoden der organischen Chemie," Bd. 14/1, "Makromolekulare Stoffe I," Georg Thieme-Verlag, Stuttgart, 1961, pages 59 ff.

Suitable aminoplasts include the known reaction products of aldehydes, particularly formaldehyde, with substances carrying several amino or amido groups, e.g., melamine, urea, N,N'-ethylene urea, dicyanodiamide, and benzoguanamine. Particularly suitable are the aminoplasts modified with alcohols, such as the conventional butylated resinoids. In place of these resinous precondensates, it is also possible to employ the etherified, precursors thereof, e.g., hexamethylol melamine. A wide variety of commercially available aminoplasts is available for combination with the linear polyesters employed in accordance with the present invention. For more details regarding the aminoplasts which can be used, reference is made to "Organic Protective Coatings," Von Fischer and Bobaleck, 1953, Reinhold, pages 210–225; "Lackkunstharze" von H. Wagner and H. F. Sarx, Carl Hanser-Verlag, München, 4. edition, 1959, pages 60–74.

For the production of the coatings, the copolymerizate and the aminoplast are first dissolved in a solvent, preferably in a conventional varnish solvent, such as, e.g., xylene, butanol, mixtures thereof, etc. In this connection, the weight ratio of copolymerizate:aminoplast is preferably 60:40 and 90:10. The resulting varnish is then pigmented, if desired, applied, and baked in at temperatures of 100–200° C. The cross-linking reactions taking place during this process are catalytically accelerated by acids. For this reason, it is advisable to add acidic substances to the varnish. With the addition of, for example 0.5% p-toluenesulfonic acid (based on the total binder), the cross-linking reaction proceeds sufficiently rapidly at 120–130° C. If acrylic acid has been polymerized into the copolymerizate, the acidity of the carboxyl group is sufficient for catalyzing the cross-linking process, so that the curing step can be conducted at about 130° C. even without the addition of an acid.

The cross-linking is achieved by reaction between the hydroxyl- or carboxyl-groups of the polyester and the N-methylol- or N-methylol-ether-groups of the aminoplast. More information on the structures of the cross-linked groups will be found in the literature, e.g., "Lackkunstharze" von H. Wagner and H. F. Sarx, pages 66 and 70; D. H. Solomon and J. J. Hopwood, J. Appl. Polymer Sci. 10, 981 (1966).

The coatings produced according to this invention have a multitude of excellent properties. They not only have a high gloss, but are also resistant to solvents such as xylene, gasoline-benzene mixtures, esters and ketones. Moreover, they are resistant against acids and alkalis (see Examples 9 and 10). In salt spray tests, tests under tropical conditions, and tests in the weatherometer, the coatings demonstrated a superior ability to withstand the most extreme environments.

The most noteworthy feature of the coatings produced according to this invention, however, is the combination of great hardness and elasticity with high impact resistance.

The elastic behavior of coatings is customarily determined by the Erichsen depression test (according to DIN [German Industrial Standard] 53,156), indicating as a measure of the elasticity, the depression of the varnished sheet metal in mm. The essential point of this testing method is to have the deformation of the coating take place slowly (advance: 0.2 mm./sec.). Conversely, an indication of the behavior of coatings upon sudden deformation, a so-called impact depression measurement is ascertained. This measurement can be obtained, for example, with the impact depression device 226/D of Erichsen, Hemer-Sundwig. In this device, a hemisphere having a radius of 10 mm. is impressed, by a falling weight, into the sheet metal (the non-varnished side facing upwardly). By varying the height of the fall, the depression can be varied. The depression value is stated (in mm.) at the point when the varnish coating begins to tear. (The values listed in the table were obtained in this manner.)

As was mentioned in connection with the description of the state of the art, and as confirmed by comparative tests, conventional coatings of polyacrylates and aminoplasts are elastic and relatively hard; however, these coatings cannot withstand any impact. In contradistinction thereto, the coatings obtained according to the invention exhibit a high degree of hardness and elasticity, as well as high impact strength. This range of properties opens up a wide field of applications to these coatings. They are especially suitable as surfaces which are subjected to sudden impacts. This is the case, for example, when automobile enamel is subjected to the impact of pebbles, or when metal strips are subsequently punched.

The varnishes or enamels produced in accordance with this invention can be applied in any conventional manner, such as by spraying, brushing, rolling, or dipping. They are particularly valuable for coating, e.g., automobile bodies, refrigerators, washing-machines etc., also they are suitable for coil-coating.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

In the following examples, all percentages and ratios are on a weight basis.

EXAMPLE 1

A mixture of 100 parts of xylene, 29 parts of methyl methacrylate, 20 parts of butyl acrylate, 1 part of acrylic acid, and 50 parts of a fumaric ester of the above-mentioned general formula ($n=4$) is agitated at 75° C. for 6 hours in the presence of 2 parts of azodiisobutyric acid nitrile to effect polymerization. The thus-obtained polymer solution is diluted with xylene to a concentration of 40% by weight of polymer, and mixed with a commercially available 55% by weight solution of a melamine-formaldehyde condensate in a xylene-butanol mixture (1:1) (Maprenal TTX of Cassella) to yield a ratio of copolymerizate to melamine resin in the binder of 70:30. The resultant varnish is pigmented with $TiO_2$ (ratio of binder:pigment=1:0.6), applied to test metal sheets, and cured. The hardness, elasticity, and impact depression properties of the resulting coatings are then measured (see Table 1).

EXAMPLE 2

A mixture of 100 parts of xylene, 29 parts of methyl methacrylate, 20 parts of butyl acrylate, 1 part of acrylic acid, and 50 parts of a fumaric ester of the above general formula ($n=5$) is agitated in the presence of 2 parts of azodiisobutyric acid nitrile for 6 hours at 75° C. The thus-obtained solution of polymer is diluted with xylene to a concentration of 40% polymer, and mixed with a commercially available 55% solution of a melamine-formaldehyde condensate in a xylene-butanol mixture (1:1) (Maprenal TTX of Cassella), to yield a ratio of copolymerizate to melamine resin in the binder of 70:30. The varnish is pigmented with $TiO_2$ (ratio of binder:pigment=1:0.6), applied to test metal sheets, and cured; then, hardness, elasticity and impact depression of the resulting coatings are measured (see Table 1).

EXAMPLE 3

A mixture of 100 parts of xylene, 19 parts of methyl methacrylate, 1 part of acrylic acid, and 80 parts of a fumaric ester of the above general formula ($n=5$) is agitated in the presence of 2 parts of azodiisobutyric acid nitrile for 6 hours at 75° C. The thus-produced solution of polymer is diluted with xylene to a content of 40% polymer and mixed with a commercially available 55% solution of a melamine-formaldehyde condensate in a xylene-butanol mixture (1:1) (Maprenal TTX of Cassella), to yield a ratio of copolymerizate to melamine resin in the binder of 70:30. The varnish is pigmented with $TiO_2$ (ratio of binder:pigment=1:0.6), applied to test metal sheets and cured; then, hardness, elasticity and impact depression of the resulting coatings are measured (see Table 1).

EXAMPLE 4

A mixture of 100 parts of xylene, 19 parts of methyl methacrylate, 20 parts of butyl acrylate, 1 part of acrylic acid, and 60 parts of a fumaric ester of the above general formula ($n=10$) is agitated in the presence of 2 parts of azodiisobutyric acid nitrile for 6 hours at 75° C. The thus-obtained solution of polymer is diluted with xylene to a concentration of 40% polymer and mixed with a commercially available 55% solution of a melamine-formaldehyde condensate in a xylene-butanol mixture (1:1) (Maprenal TTX of Cassella), to yield a ratio of copolymerizate to melamine resin in the binder of 70:30. The varnish is pigmented with $TiO_2$ (ratio of binder:pigment=1:0.6), applied to metal test sheets, and cured; thereafter, hardness, elasticity, and impact depression of the resulting coatings are measured (see Table 1).

EXAMPLE 5

A mixture of 100 parts of xylene, 29 parts of methyl methacrylate, 20 parts of butyl acrylate, 1 part of acrylic acid, and 50 parts of a fumaric ester of the above general formula ($n=10$) is agitated in the presence of 2 parts of azodiisobutyric acid nitrile for 6 hours at 75° C. The thus-obtained solution of polymer is diluted with xylene to a concentration of 40% polymer and mixed with a commercially available solution of a melamine-formaldehyde condensate in a xylene-butanol mixture (1:1) (Maprenal TTX of Cassella), to yield a ratio of copolymerizate to melamine resin in the binder of 70:30. The varnish is pigmented with $TiO_2$ (ratio of binder:pigment=1:0.6), applied to metal test sheets, and cured; then, hardness and impact depression of the resulting coatings are measured (see Table 1).

EXAMPLE 6

A mixture of 100 parts of xylene, 29 parts of methyl methacrylate, 20 parts of butyl acrylate, 1 part of acrylic acid, and 50 parts of a fumaric ester of the above general formula ($n=5$) is agitated in the presence of 2 parts of azodiisobutyric acid nitrile for 6 hours at 75° C. The thus-obtained solution of polymer is diluted with xylene to a concentration of 40% polymer and mixed with a commercially available 60% solution of a urea-formaldehyde condensate in butanol (Plastopal EBS 200 of Badische Anilin-und Soda-Fafrik A.G.), to yield a ratio of copolymerizate to melamine resin in the binder of 70:30. The varnish is pigmented with $TiO_2$ (ratio of binder:pigment=1:0.6), applied to test metal sheets, and cured; then, hardness and impact depression of the resulting coatings are measured. The coatings exhibit a remarkable resistance to baking at increased temperatures, as demonstrated by the following data:

| Baking conditions | 30 minutes, 130° C. | 30 minutes, 160° C. | 30 minutes, 190° C. |
| --- | --- | --- | --- |
| Hardness according to DIN 53,157 (seconds) | 149 | 156 | 176 |
| Depression according to DIN 53,156 (mm.) | 9.3 | 9.6 | 9.0 |
| Impact depression (mm.) | >5 | >5 | 1.6 |

EXAMPLE 7

A mixture of 100 parts of xylene, 29 parts of methyl methacrylate, 20 parts of butyl acrylate, 1 part of acrylic acid, and 50 parts of a fumaric ester of the above general formula ($n=5$) is agitated in the presence of 2 parts of azodiisobutyric acid nitrile for 6 hours at 75° C. The thus-produced polymer solution is diluted with xylene to a concentration of 40% polymer and mixed with a 40% solution of hexa-(methoxymethyl)-melamine in a xylene-butanol mixture (1:1), to yield a ratio of copolymerizate to melamine resin in the binder of 80:20. Then, there are additionally added 0.35% p-toluenesulfonic acid (based on the binder). The varnish is pigmented with $TiO_2$ (ratio of binder:pigment=1:0.6), applied to test metal sheets, and cured; then, hardness, elasticity and impact depression of the resulting coatings are measured. These coatings also substantially maintain their properties when being baked, as demonstrated by the following data:

| Baking conditions | 30 minutes, 130° C. | 30 minutes, 160° C. | 30 minutes, 190° C. |
| --- | --- | --- | --- |
| Hardness according to DIN 53,157 (seconds) | 140 | 158 | 158 |
| Depression according to DIN 53,156 (mm.) | 9.6 | 9.0 | 8.8 |
| Impact depression depth (mm.) | 5 | 4.8 | 3.0 |

EXAMPLE 8

A mixture of 100 parts of xylene, 29 parts of methyl methacrylate, 20 parts of butyl acrylate, 1 part of acrylic acid, and 50 parts of a fumaric ester of the above general formula ($n=5$) is agitated in the presence of 2 parts of azodiisobutyric acid nitrile for 6 hours at 75° C. The thus-obtained polymer solution is diluted with xylene to a concentration of 40% polymer, mixed with a commercially available 55% solution of a melamine-formaldehyde condensate in a xylene-butanol mixture (1:1) (Maprenal TTX of Cassella) and also with a commercially available 62% solution of a benzoguanamine-formaldehyde condensate in butanol (Maprenal HM of Cassella), to yield a ratio of copolymerizate to melamine resin to benzoguanamine resin in the binder of 70:15:15. The varnish is pigmented with $TiO_2$ (ratio of binder:pigment=1:0.6), applied to test metal sheets and hardened; thereafter, hardness, elasticity, and impact depression of the resulting coatings are measured. These coatings also are substantially stable, upon baking, as shown by the following values;

| Baking conditions | 30 minutes, 130° C. | 30 minutes, 160° C. | 30 minutes, 190° C. |
| --- | --- | --- | --- |
| Hardness according to DIN 53,157 (seconds) | 154 | 156 | 158 |
| Depression according to DIN 53,156 (mm.) | 9.2 | 8.0 | 6.2 |
| Impact depression (mm.) | 5 | 4.0 | 3.0 |

EXAMPLE 9

The clear varnish produced according to Example 7 is pigmented with 50 parts of titanium dioxide, applied to test metal sheets, and baked for 30 minutes at 130° C. The resulting coatings exhibited no visible damage after being subjected to 10% sulfuric acid at 50° C. for eight hours, and after being subjected to 10% hydrochloric acid at room temperature for eight days.

EXAMPLE 10

The clear varnish produced according to Example 8 is pigmented with 50 parts of titanium dioxide, applied to test metal sheets, and baked for 30 minutes at 130° C. The resulting coatings did not exhibit any visible damage after being subjected to 10% sulfuric acid at 50° C. for eight hours, and after being subjected to 10% hydrochloric acid at room temperature for eight days.

COMPARATIVE EXAMPLE I

A mixture of 100 parts of xylene, 45 parts of methyl methacrylate, 39 parts of butyl acrylate, 1 part of acrylic acid, and 15 parts of propylene glycol monoacrylate is agitated in the presence of 2 parts of azodiisobutyric acid nitrile for 6 hours at 75° C. The thus-obtained polymer solution is diluted with xylene to a concentration of 40% polymer and mixed with a commercially available 55% solution of a melamine-formaldehyde condensate in a xylene-butanol mixture (1:1) (Maprenal TTX of Cassella), to yield a ratio of copolymerizate to melamine resin in the binder of 70:30. The varnish is pigmented with $TiO_2$ (ratio of binder:pigment=1:0.6), applied to test metal sheets, and cured; then, hardness, elasticity and impact depression of the resulting coatings are measured (see Table 1). As demonstrated by the results, the coatings, although having a very good elasticity and a medium hardness, exhibit a very poor impact strength.

COMPARATIVE EXAMPLE II

A mixture of 100 parts of xylene, 44.75 parts of methyl methacrylate, 44.75 parts of ethyl acrylate, 0.5 part of methacrylic acid, and 10 parts of propylene glycol monoacrylate is agitated in the presence of 2 parts of azodiisobutyric acid nitrile for 6 hours at 75° C. The thus-produced polymer solution is diluted with xylene to a concentration of 40% polymer and mixed with a commercially available 55% solution of a melamine-formaldehyde condensate in a xylene-butanol mixture (1:1) (Maprenal TTX of Cassella), to yield a ratio of copolymerizate to melamine resin in the binder of 70:30. The varnish is pigmented with $TiO_2$ (ratio of binder:pigment=1:0.6), applied to test metal sheets, and cured; then, hardness, elasticity, and impact depression of the resulting coatings are measured (see Table 1). As demonstrated by the results, although the coatings are hard, they are neither elastic nor impact resistant.

TABLE 1.—PROPERTIES OF THE COATINGS PRODUCED ACCORDING TO THE INVENTION AND THOSE PREPARED FOR COMPARISON PURPOSES

| Example/comparative example | Dicarboxylic acid ester | Methyl methacrylate | Butyl acrylate | Acrylic acid | Ethyl acrylate | Styrene | Propylene glycol monoacrylate | Aminoplast |
|---|---|---|---|---|---|---|---|---|
| 1 | 50 (n=4) | 29 | 20 | 1 | | | | Melamine-formaldehyde condensate. |
| 2 | 50 (n=5) | 29 | 20 | 1 | | | | Do. |
| 3 | 80 (n=5) | 19 | | 1 | | | | Do. |
| 4 | 60 (n=10) | 19 | 20 | 1 | | | | Do. |
| 5 | 50 (n=10) | 29 | 20 | 1 | | | | Do. |
| 6 | 50 (n=5) | 29 | 20 | 1 | | | | Urea-formaldehyde condensate. |
| 7 | 50 (n=5) | 29 | 20 | 1 | | | | Hexa-(methoxymethyl)-melamine. |
| 8 | 50 (n=5) | 29 | 20 | 1 | | | | Melamine-formaldehyde condensate plus benzoguanamine-formaldehyde condensate. |
| 11 | | | | | | | | |
| 1 | | 45 | 39 | 1 | | | 15 | Melamine-formaldehyde condensate. |
| 2 | | 44.75 | | 0.5 | 44.75 | | 16 | Do. |

| Example/comparative example | After hardening at 130° C./30 minutes | | | After aging at 90° C./2.5 days | | |
|---|---|---|---|---|---|---|
| | Hardness¹ (sec.) | Depression² (mm.) | Impact depression (mm.) | Hardness¹ (sec.) | Depression² (mm.) | Impact depression (mm.) |
| 1 | 160 | 7 | 5 | 160 | 7 | 5 |
| 2 | 145 | 7 | 5 | 160 | 7 | 5 |
| 3 | 175 | 7 | 4 | 176 | 7 | 4 |
| 4 | 150 | 8 | 5 | 136 | 7 | 5 |
| 5 | 150 | 8 | 5 | 136 | 7 | 4 |
| 6 | 149 | 9.3 | >5 | | | |
| 7 | 140 | 9.6 | 5 | | | |
| 8 | 154 | 9.2 | 5 | | | |
| 11 | | | | | | |
| 1 | 100 | 9 | <1 | 105 | 9 | <1 |
| 2 | 126 | 0 | <1 | 134 | 0 | <1 |

¹ Pendulum hardness according to DIN 53 157.
² Erichsen depression according to DIN 53 156.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A coating composition comprising:
   (A) 10-40 parts by weight of an aminoplast; and
   (B) 90-60 parts by weight of a copolymer of:
      (1) an acrylate selected from the group consisting of a (lower)alkylacrylate and a (lower) alkyl methacrylate;
      (2) an unsaturated dicarboxylic acid ester of the formula

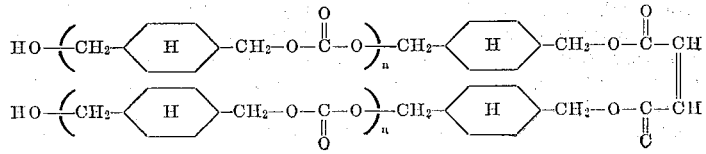

wherein $n$ represents an integer of 4 to 12 inclusive; said aminoplast is a reaction product of an aldehyde with a compound having a plurality of amino or amido groups; and the weight ratio of said acrylate to said ester is about 10:90 to 50:50 respectively.

2. A coating composition as defined by claim 1 wherein said copolymer further comprises acrylic acid in a weight ratio to said copolymer of 0.1:99.5 to 5:95 respectively.

3. A coating composition as defined by claim 1 wherein the aminoplast is selected from the group consisting of melamine-formaldehyde condensate, urea-formaldehyde condensate, and hexa-(methoxymethyl)-melamine.

4. A coating composition as defined by claim 1 wherein the acrylate is methyl methacrylate, ethyl acrylate, and butyl acrylate.

5. A coating composition as defined by claim 3 wherein the acrylate is methyl methacrylate, ethyl acrylate, and butyl acrylate.

6. An article of manufacture comprising a metallic base having superimposed thereon a substantially uniform layer of a cured coating composition as defined by claim 1.

7. An article of manufacture comprising a metallic base having superimposed thereon a substantially uniform layer of a cured coating composition as defined by claim 5.

8. A coating composition as defined by claim 1 wherein $n$ represents 5 to 10 inclusive.

9. A coating composition as defined by claim 3 wherein $n$ represents 5 to 10 inclusive.

10. A coating composition as defined by claim 5 wherein $n$ represents 5 to 10 inclusive.

11. A coating composition as defined by claim 1 wherein said weight ratio is 15:85 to 50:50 respectively.

12. A coating composition as defined by claim 2 wherein said weight ratio is 0.5:99.5 to 2:98 respectively.

References Cited
UNITED STATES PATENTS

| | | | |
|---|---|---|---|
| 2,787,630 | 4/1957 | Katz et al. | 260—463 |
| 3,227,680 | 1/1966 | Tamblyn et al. | 260—75 |
| 3,245,963 | 4/1966 | Schramm et al. | 260—77.5 |
| 3,248,416 | 4/1966 | Stevens | 260—77.5 |
| 3,449,467 | 6/1969 | Wynstra | 260—850 |
| 3,457,324 | 7/1969 | Sekmakas | 260—850 |

JOHN C. BLEUTGE, Primary Examiner

U.S. Cl. X.R.

117—132, 161; 260—33.4, 33.6, 39, 40, 41, 75, 77.5, 78.5, 851